United States Patent [19]

Tyer

[11] Patent Number: 5,690,864
[45] Date of Patent: Nov. 25, 1997

[54] RETRIEVABLE AERATION SYSTEM

[76] Inventor: Robert R. Tyer, 9410 FM 1097 West, Willis, Tex. 77378

[21] Appl. No.: 746,299

[22] Filed: Nov. 8, 1996

Related U.S. Application Data

[63] Continuation-in-part of Ser. No. 664,405, Jun. 17, 1996.
[51] Int. Cl.$^6$ ..................................................... B01F 3/04
[52] U.S. Cl. ................................ 261/122.1; 261/DIG. 47
[58] Field of Search ........................... 261/122.1, DIG. 47

[56] References Cited

U.S. PATENT DOCUMENTS

| | | | |
|---|---|---|---|
| 2,502,187 | 3/1950 | Wahlgren | 261/122.1 |
| 2,650,810 | 9/1953 | Nordell | 261/DIG. 47 |
| 3,880,965 | 4/1975 | Dudis et al. | 261/122.1 |
| 4,273,732 | 6/1981 | Roediger | 261/DIG. 47 |
| 4,563,277 | 1/1986 | Tharp | 261/122.1 |
| 5,290,487 | 3/1994 | Ludwig | 261/122.1 |
| 5,587,114 | 12/1996 | Tharp | 261/DIG. 47 |

Primary Examiner—Tim R. Miles
Attorney, Agent, or Firm—Daniel V. Thompson

[57] ABSTRACT

An aeration system for a wastewater treatment plant includes an air supply pipe for receiving compressed air. The air supply pipe has a plurality of outlets. A flexible air supply conduit extends from each outlet to an elongate aerator having ends. An end fitting is connected to the aerator at each end thereof, with walls in each end fitting defining an attachment location. A guide member is provided for each end fitting, each guide member having lower and upper ends, and the guide member being loosely interfitted with the attachment location of the end fitting to permit relative movement between the aerator and guide member. The lower end of the guide member is fixed with respect to the bottom of the wastewater treatment basin. The upper end of the guide member is attached to a stop member. A spacer for each end of the aerator is provided, the spacer having upper and lower ends, and the upper end contacting the stop member and the lower end contacting the aerator end fitting, such that the aerator is positioned away from the stop members by the spacers at each end, with the aerator being repositionable by removing the spacers from the guide members or by changing the length of the spacers.

21 Claims, 5 Drawing Sheets

1

RETRIEVABLE AERATION SYSTEM

CROSS-REFERENCE TO RELATED APPLICATION

This application is a continuation-in-part of U.S. Ser. No. 08/664,405, filed Jun. 17, 1996.

TECHNICAL FIELD

This application relates to aeration systems for wastewater treatment plants.

BACKGROUND OF THE INVENTION

Tubular fine-bubble diffusers offer several advantages over circular disk diffusers. These advantages include oxygen transfer efficiency and mechanical advantages. Typically a tubular fine-bubble diffuser has a perforated membrane supported by a tubular membrane support.

The primary mechanical advantage of tubular diffusers is that they can be mounted under the air supply pipe so that they are the low point in the system. This allows water to be removed continuously through the membrane so that no separate water removal system is required. Disk diffusers are typically mounted above the pipe so that water that enters the system has no way to get out. Separate water removal systems must be provided when disk diffusers are used. In addition, tubular diffusers can be mounted adjacent to the floor, and this additional submergence optimizes mixing and oxygen transfer.

At the proper air flow rate, tubular diffusers meet or exceed the oxygen transfer efficiency of disk diffusers. Tubular diffusers are not as affected by the chimney effect which reduces transfer efficiency by bringing bubbles into close contact with one another at a point above the diffuser. It is this chimney effect that has been the subject of so much discussion about maximum size of disk diffusers. Many experts agree that the optimum diameter for disk diffusers is less than one foot. The length of tubular diffusers has no limit other than structural.

Tubular diffusers achieve as high a transfer efficiency as disk diffusers, and, because they are less affected by the chimney effect, they can be used over a wider range of air flows. The transfer efficiency of tubular diffusers is relatively independent of their diameter and is, for the most part, a function of the air flow per unit of length.

The primary reason that the advantages of tubular diffusers have not been applied is that the weakness of their mounting systems limits their length to approximately twenty-four to thirty-six inches. This makes it difficult to get enough tubes in the basin to use the low air flow rates required to get high transfer efficiency. The result is usually a cluster of tubes which act as a single point source - essentially like a disk diffuser.

Thus, there presently exists a need for a system that will enable the use of long tubular diffusers, which will solve this problem by avoiding the effect of clustering tubes.

SUMMARY OF THE INVENTION

An aeration system for a wastewater treatment plant includes an air supply pipe for receiving compressed air. The air supply pipe has a plurality of outlets, with a flexible air supply conduit extending from each outlet to an elongated aerator. An end fitting is included in the aerator at each end. Each end fitting has walls defining an attachment location. A guide member is provided for each end fitting, with the guide member being loosely interfitted with the attachment location of the end fitting to permit relative movement between the aerator and guide member. The lower end of the guide member is fixed with respect to the bottom of the wastewater treatment basin. An upper end of the guide member is attached to a stop member, and a spacer is provided for each end of the aerator for positioning the aerator away from the stop member at the top of each guide member.

BRIEF DESCRIPTION OF THE DRAWINGS

A more complete understanding of the invention and its advantages will be apparent from the Detailed Description taken in conjunction with the accompanying Drawings, in which.

DETAILED DESCRIPTION OF THE PREFERRED EMBODIMENT

Figure 1:
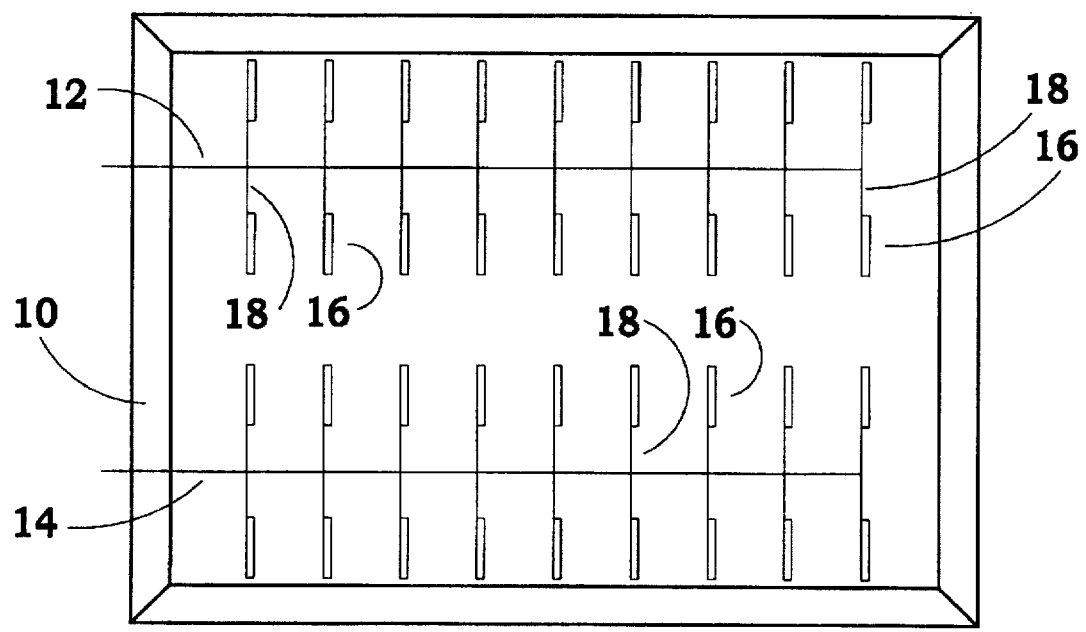
FIG. 1 is a schematic plan view of a first embodiment of the invention.

Referring initially to FIG. 1, a wastewater treatment plant includes a wastewater treatment basin 10. While basin 10 is illustrated as being rectangular, with sloping side walls, it will be recognized that the system of this invention is useful in many other configurations of basins. An air supply pipe 12 receives compressed air from a source of compressed air (not shown), as does air supply pipe 14. Each air supply pipe 12, 14 supplies air to a plurality of elongate aerators 16 through flexible air supply conduits 18.

Figure 2:
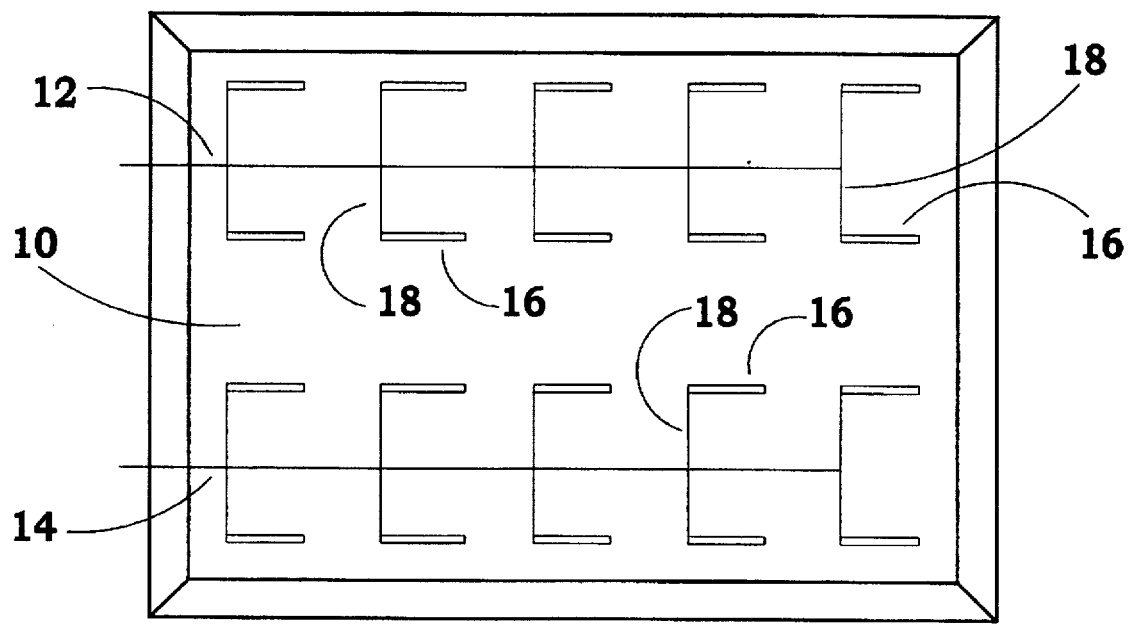
FIG. 2 is an alternate to the embodiment of FIG. 1, also shown in schematic plan view.
Figure 3:
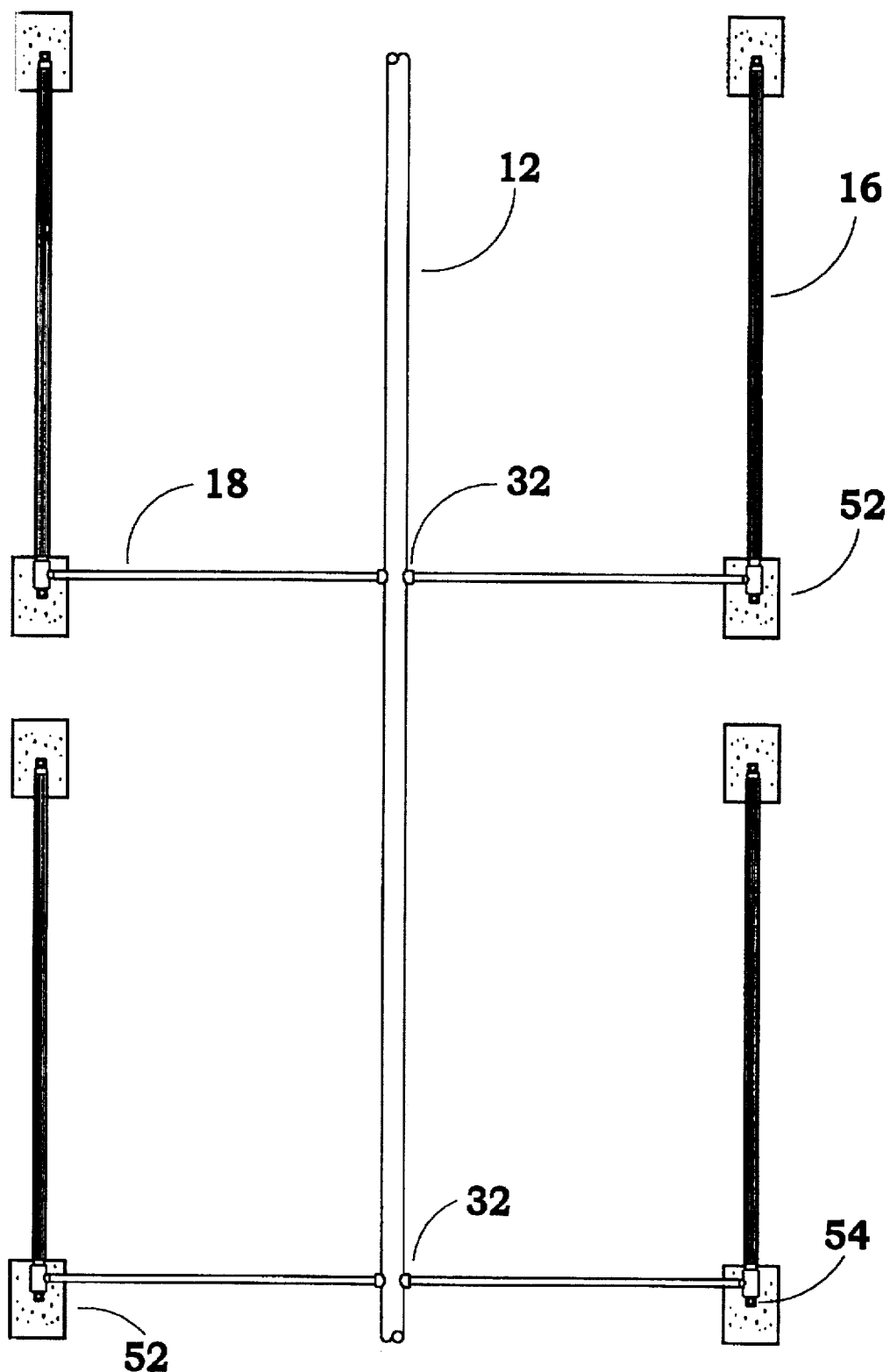
FIG. 3 is partial plan view illustrating the system of the present invention in more detail.
Figure 4:
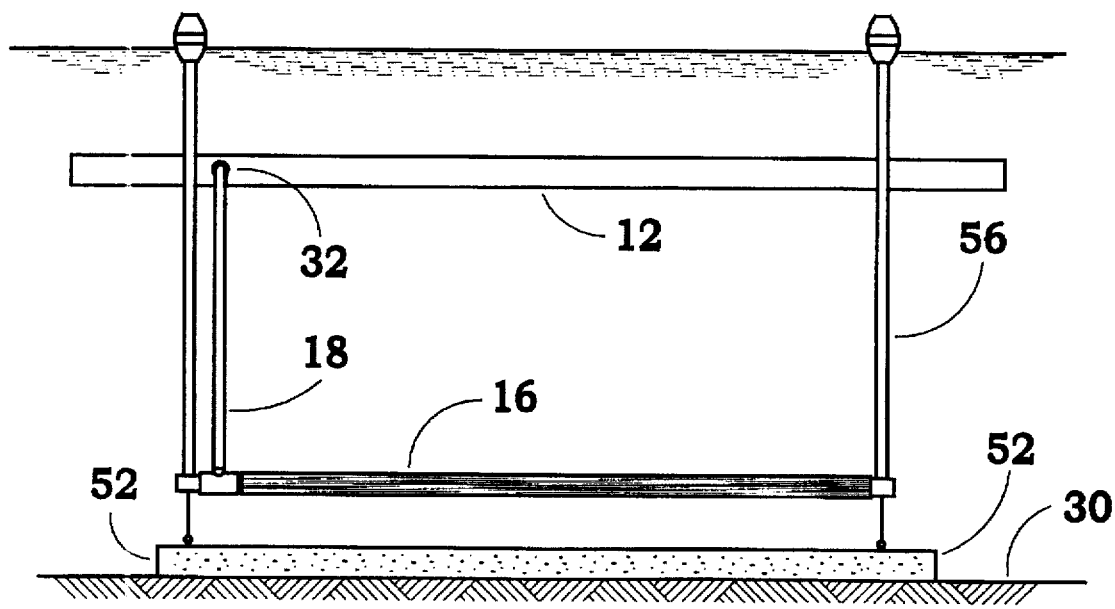
FIG. 4 is a side view of the system of FIG. 3.
Figure 5:
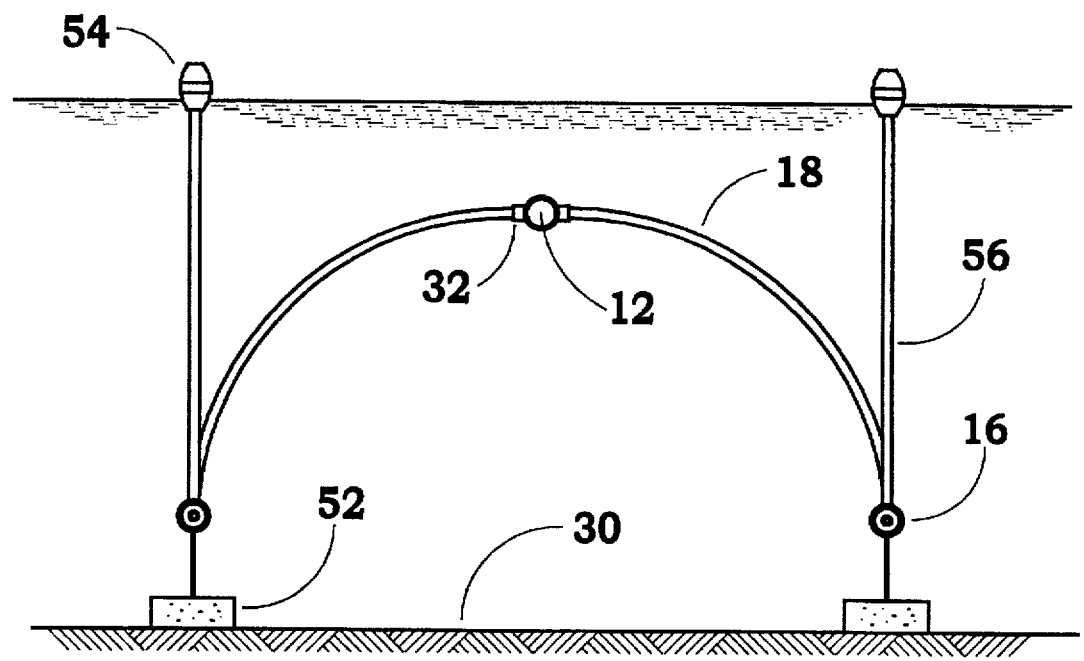
FIG. 5 is a side view similar to FIG. 4, rotated 90 degrees.
Figure 6:
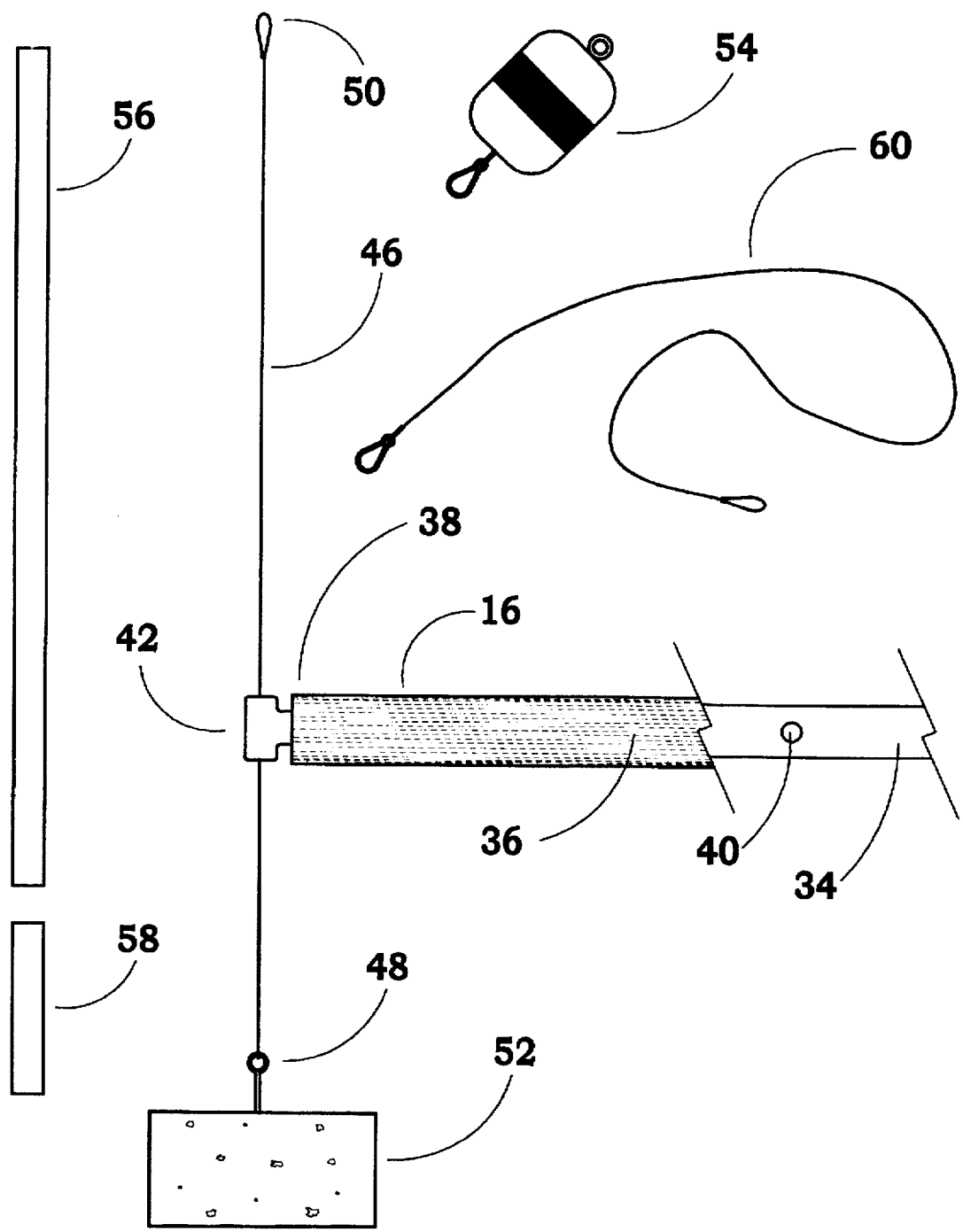
FIG. 6 is an exploded view illustrating components of the guide member, spacer and stop member.

FIG. 2 illustrates an alternate layout, where elongate aerators 16 are parallel to the air supply pipes 12, 14. In FIG. 1, aerators 16 are perpendicular to the air supply pipes 12, 14. The particular layout is a matter of design choice, as is well known to one skilled in the art.

Referring now to FIGS. 3–9, where like numerals indicate like and corresponding elements, the details of the system of this invention may be understood.

The aeration system includes a horizontal air supply pipe or "lateral" for receiving compressed air designated by the numeral 12. The air supply lateral is vertically spaced-apart from floor 30 of the wastewater treatment basin, although alternate vertical positionings are possible. Lateral 12 has a plurality of outlets formed by saddle branches 32.

Figure 7:
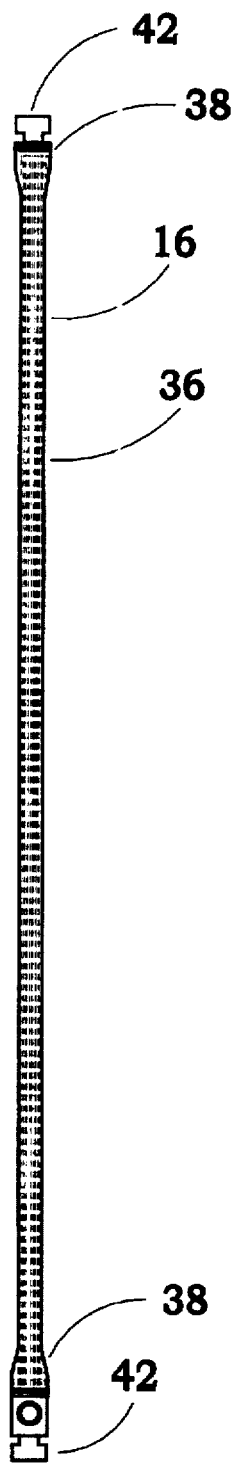
FIG. 7 is a side view of an aerator useful with the invention.
Figure 8:
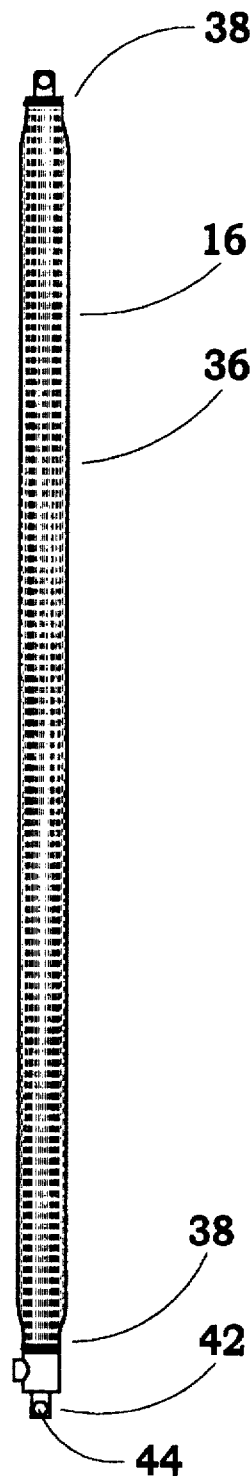
FIG. 8 is a view similar to FIG. 7, except that it is a top view.
Figure 9:
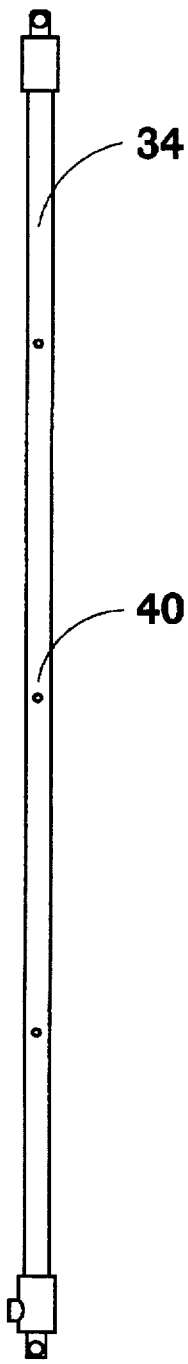
FIG. 9 is a view similar to FIG. 8, with the membrane removed to illustrate the internal details of the aerator.

Long, flexible, aerator conduits or "feedlines" 18 extend from each outlet 32 to an aerator 16. As best shown in FIGS. 7, 8 and 9, each aerator 16 includes a membrane support tube 34 and a perforated membrane 36. Membrane 36 is sleeved over membrane support tube 34, and the membrane 36 has ends 38 sealed to the membrane support tube 34 by way of clamps or the like. Membrane support tube has walls 40 defining at least one air aperture to supply air to the membrane 36 between the ends 38.

An end fitting 42 is connected to the membrane support tube 34 at each end 38. Walls 44 (FIG. 8) in each end fitting 42 define an attachment location.

A guide member 46 is provided for each end fitting. Each guide member has lower and upper ends 48,50. In the preferred embodiment, guide member 46 is a flexible cable, however, many alternate forms of a guide member may be used such as tubes, rods, ropes and even guide channels fixed to basin walls. Guide member 46 is loosely interfitted with the attachment location defined by walls 44 in end fitting 42. Again, the preferred attachment location is provided by a Tee-like structure having a central cable passageway, however, many alternate forms of a loosely interfitting attachment locations are possible. The essential feature is that relative movement between the aerator and the guide member is provided.

Lower end 48 is fixed with respect to the basin floor 30. Preferably, an aerator ballast block 52 provides the fixed attachment, however, other means of attachment are possible. Upper end 50 of guide member 46 is attached to a stop member 54, which preferably includes a float removably attached to a loop by a clip, but stop member 54 may be provided in many alternate forms.

A spacer 56 is provided for each end of the aerator. Spacer 56 has upper and lower ends 58, 60. The upper end 58 contacts stop member 54, and the lower end contacts aerator end fitting 42 when aerator 16 has positive buoyancy, i.e., when the system is in operation and the aerator is full of air. Thus, aerator 16 at each end is positioned downwardly away from stop member 54 by the spacer 56. In the preferred embodiment, spacer 56 is a tube that is slipped over cable 46, however, equivalent forms of this structure will be apparent. Aerator 16 is re-positionable by removing spacer 56 from guide member 46, or by changing the length of spacer 56. In operation, aerator 16 has positive buoyancy and raises to the height established by the length of guide member 46 less the length of spacer 56.

An optional bottom spacer 58 may also be provided in some installations, where aerator 16 is not desired to be at the lowest possible submerged location and spacing above the bottom is desired when the aerator has negative buoyancy. In some instances, it is desirable to space the aerator 16 from the bottom of the basin when the system is out of operation and no compressed air is being supplied. Bottom spacer 58 need not extend the entire distance between aerator and lower end 48 of guide member 46. Bottom spacer 58 need only have the desired length the aerator 16 should be spaced above the bottom whenever the system is out of operation.

An extension guide member 60 may be provided to enable the easy installation, removal and interchange of upper spacers 56. It may be desirable to exchange different lengths of spacers 56, or remove them temporarily to raise aerators 16 to the surface for service. Depending on the overall lengths of guide members 46 and spacers 56, it may be desirable to attach extension guide members 60 at the time of the servicing to enable spacer 56 to be removed without losing upper end 50 of guide member 46 inside the spacer. To permit this operation, extension guide member 60 should have a length longer than that of upper spacer 56.

The illustrated embodiment has the aerator feedline 18 connected to the aerator 16 at an end, which allows the use of a single membrane 36. The length of the membrane 36 is limited only by the structural characteristics of the membrane support tube 34 that supports it. This is especially true for "lay-flat" membranes, as illustrated in FIGS. 7 and 8, since they are easy to make in any length. In contrast, mandrel-cured membranes are limited by the length of the mandrel and the length of the autoclave in which they are cured. Lay-flat membranes are placed in the autoclave in a roll of essentially any length. The only real reason to use mandrel-cured (round) membranes is so that they are easier to slip onto the support tubes. Layflat membranes are essentially impossible to slip onto a tube of about the same diameter—and they do not clamp well at the ends if the tube is much smaller. The preferred construction has a pipe coupling at each end of the pipe, the lay-flat membranes are sized to clamp on the diameter of the coupling. Then the tube between the coupling will be smaller to allow the membrane to slip over easily.

One or both ends of aerator 16 can serve as a flushout if connected with a removable threaded connection.

The air laterals 12,14 can be installed at any elevation within the basin. They can be ballasted on the bottom, floated on the surface or suspended anywhere in between.

Other special features of the retrievable aeration system include high efficiency fine-bubble aeration and mixing. The system can be installed in any basin regardless of whether the floor is level or able to support the weight of the ballast. The submergence of the aerator is controlled by the relative lengths of guide members 46 and spacers 56, which can be individually set for each location to account for unlevel basin floors or subsidence of the ballast blocks. The system may even be installed without removing water from the basin.

The aerators are easily retrieved and maintained without lifting the ballast. A substantial draw back of prior art retrievable systems is that the ballast for the aerator is integral with the unit, and the entire weight must be lifted to service a unit. Here, by removing stop member 54 from the upper end 50 of guide member 46 the aerator is disconnected from the ballast and easily raised to the surface.

For the same reason, replacement of the aerators is always to exactly the preselected location and elevation, since the ballast remains on the bottom during servicing. Yet, the aerators can be easily adjusted to different elevations whenever desired, merely by substituting a spacer 56 of different length.

All components, including air laterals, can float on the surface or be submerged to any preselected elevation. This allows air laterals to be set at an elevation high enough to drain water to the aerators while staying safely submerged below ice and other exposure problems such as vandalism and sunlight. The aerators are designed to continuously remove water during operation.

Individual aerators can be retrieved while the balance of the system remains in operation. System components are easily expanded or modified to meet changing requirements. The system is ideal for new construction, upgrades of existing lagoons, aquaculture, and sequencing batch reactors.

In contrast, prior art retrievable systems, such as the one shown in U.S. Pat. No. 4,563,277 to Tharp, require heavy ballast that is difficult for operators to lift and handle. The basin floor must be level so that all aerators operate at the same submergence. The elevation and orientation of aerators cannot be checked after the aerators have been retrieved and replaced. The construction of the basin, or rehabilitation of an existing basin, is expensive due to the requirement that the floor be level. If sedimentation occurs, lowering aerators to their original elevation and orientation is not possible.

Installation of the system "wet" is simple and straightforward:

1. Attach end of stainless steel cable to ballast and lower ballast to floor of basin. This can be accomplished more easily if a rope is around the ballast for use in lowering the ballast. Leave the rope on the ballast until final position is complete. Then remove the rope by sliding the loose end away from the ballast.
2. Pull vertically upward on the cable. When the cable is vertical above the ballast, note the point on the cable at which it intersects the water surface. Attach the stop member on the cable at this point.
3. Float the aerator on the surface and connect it to the cable by running the stop member through the run of the Tee at the end of the aerator.
4. When all the aerators are floating on the surface with their ends connected to the cables, review the layout and adjust as necessary. Tighten any loose cables by adjusting the stop members. The aerators are now ready to be submerged.
5. Attach the extension cable to the cable stop and run the extension cable through the tubular spacer. The extension cable can now be used to pull the cable stop through the tubular spacer.
6. Push the tubular spacer down the cable toward the ballast while pulling the cable upward through the end of the tube. This pushes the end of the aerator down. This is easier if both ends of the aerator are pushed down at the same time.
7. When the cable stop exits the tube of the tubular spacer, attach the float to the stop member and remove the extension cable. This completes installation. Each end of each aerator is below the surface a distance equal to the length of the tubular spacer.

Installation in a dry basin is similar, except that (a) all of the ballast must be at the same elevation, or (b) the elevation of each ballast must be measured and each cable be made to proper length or (c) final attachment of the stop members must wait until the basin is filled.

If future changes in aerator operating depth are desired, the lengths of the tubular spacers can be increased or decreased by adding an additional section of spacer.

To remove the aerators for maintenance and inspection, attach the cable extension, remove the float and allow the aerator to float the to the surface.

The easiest way to install so that all components are beneath the surface is to lower the water surface, install the equipment as though it were intended to float and then submerge the equipment by raising the water level. This requires that the water level be lowered for floating air laterals.

Whereas, the present invention has been described with respect to specific embodiments thereof, it will be understood that various changes and modifications will be suggested to one skilled in the art, and it is intended to encompass such changes and modifications as fall within the scope of the appended claims.

I claim:

1. An aeration system for a wastewater treatment plant, comprising:

an air supply pipe for receiving compressed air;

the air supply pipe having a plurality of outlets;

a flexible air supply conduit extending from each outlet to an elongate aerator having ends;

an end fitting connected to the aerator at each end thereof, with walls in each end fitting defining an attachment location;

a guide member for each end fitting, each guide member having lower and upper ends, the guide member being loosely interfitted with the attachment location of the end fitting to permit relative movement between the aerator and guide member;

the lower end of the guide member being fixed with respect to the bottom of the wastewater treatment basin;

the upper end of the guide member being attached to a stop member; and a spacer for each end of the aerator, the spacer having upper and lower ends, the upper end contacting the stop member and the lower end contacting the aerator end fitting, such that the aerator is positioned away from the stop members by the spacers at each end, with the aerator being repositionable by removing the spacers from the guide members or by changing the length of the spacers.

2. The system of claim 1 where the air supply pipe is horizontal.

3. The system of claim 2 with the air supply pipe being vertically spaced-apart from a wastewater treatment basin floor.

4. The system of claim 1 with each aerator including a membrane support tube and a perforated membrane, the membrane being sleeved over the membrane support tube, the membrane having ends sealed to the membrane support tube, and with the membrane support tube having walls defining at least one air outlet to supply air to the membrane between the ends, and the aerator end fittings attached to ends of the membrane support tube.

5. The system of claim 4 with the ends of the membrane being attached by clamps to the end fittings, such that the membrane is easily sleeved over the relatively small diameter membrane support tube, yet secure, sealed attachments are made at the end fittings.

6. The system of claim 1 with the guide member lower end being attached to a ballast member on the basin floor.

7. The system of claim 1 with the stop member including a float.

8. The system of claim 1 with a bottom spacer located beneath the aerator for each end of the aerator, the bottom spacer having upper and lower ends, the upper end contacting the aerator end fitting when the air supply is removed, the lower end being fixed with respect to the guide member lower end, such that the aerator is vertically positioned from the guide member lower ends by the bottom spacers when the system is out of operation.

9. The system of claim 1 with an extension guide member interposed between the guide member and the stop member to permit removal of the spacer.

10. An aeration system for a wastewater treatment plant, comprising:

a horizontal air supply pipe for receiving compressed air, the air supply pipe being vertically spaced-apart from a wastewater treatment basin floor;

the air supply pipe having a plurality of outlets;

a flexible air supply conduit extending from each outlet to an elongate aerator having ends;

with each aerator including a membrane support tube and a perforated membrane, the membrane being sleeved over the membrane support tube, the membrane having ends sealed to the membrane support tube, and with the membrane support tube having walls defining at least one air outlet to supply air to the membrane between the ends, and the aerator having end fittings attached to ends of the membrane support tube;

an end fitting connected to the aerator at each end thereof, with walls in each end fitting defining an attachment location;

a guide member for each end fitting, each guide member having lower and upper ends, the guide member being loosely interfitted with the attachment location of the end fitting to permit relative movement between the aerator and guide member;

with the guide member lower end being attached to a ballast member on the basin floor;

the upper end of the guide member being attached to a stop member, the stop member including a float;

a spacer for each end of the aerator, the spacer having upper and lower ends, the upper end contacting the stop member and the lower end contacting the aerator end fitting, such that the aerator is positioned away from the stop members by the spacers at each end, with the aerator being repositionable by removing the spacers from the guide members or by changing the length of the spacers;

with an extension guide member interposed between the guide member and the stop member to permit removal of the spacer; and with a bottom spacer located beneath the aerator for each end of the aerator, the bottom spacer having upper and lower ends, the upper end contacting the aerator end fitting when the air supply is removed, the lower end being fixed with respect to the guide member lower end, such that the aerator is vertically positioned from the guide member lower ends by the bottom spacers, such that the aerator is vertically positioned from the guide member lower ends by the bottom spacers when the system is out of operation.

11. An aeration system for a wastewater treatment plant, comprising:

an air supply lateral for receiving compressed air;

the air supply lateral having a plurality of outlets;

an aerator feedline extending from each outlet to an aerator having ends;

an end fitting connected to the aerator at each end thereof, with walls in each end fitting defining a cable passageway;

a cable having lower and upper ends, the cable being loosely interfitted with each aerator end fitting to permit relative movement between the aerator and cable;

the lower end of the cable being fixed with respect to the bottom of the wastewater treatment basin floor;

the upper end of the cable being attached to a removable stop member;

an upper spacer tube for each end of the aerator, the upper spacer tube having upper and lower ends, the upper end contacting the stop member and the lower end contacting the aerator end fitting, such that the aerator is vertically positioned from the cable upper ends by the upper spacer tubes, but the aerator may be retrieved by removing the stop members.

12. The system of claim 11 where the air supply lateral is horizontal.

13. The system of claim 12 with the air supply lateral being vertically spaced-apart from a wastewater treatment basin floor.

14. The system of claim 11 with each aerator feedline being long and flexible.

15. The system of claim 11 with each aerator including a membrane support tube and a perforated membrane, the membrane being sleeved over the membrane support tube, the membrane having ends sealed to the membrane support tube, and with the membrane support tube having walls defining at least one air outlet to supply air to the membrane between the ends, and the aerator end fittings attached to ends of the membrane support tube.

16. The system of claim 15 with the ends of the membrane being attached by clamps to the end fittings, such that the membrane is easily sleeved over the relatively small diameter membrane support tube, yet secure, sealed attachments are made at the end fittings.

17. The system of claim 11 with the cable lower end being attached to a ballast member on the basin floor.

18. The system of claim 11 with the stop member including a float.

19. The system of claim 11 with a lower spacer tube for each end of the aerator, the lower spacer tube having upper and lower ends, the lower end contacting the cable lower end and the upper end contacting the aerator end fitting when the aerator has negative buoyancy, such that the aerator is vertically positioned from the cable lower ends by the lower spacer tubes when the system is taken out of operation.

20. The system of claim 11 with an extension cable member interposed between the cable and the stop member to permit removal of the upper spacer tube.

21. An aeration system for a wastewater treatment plant, comprising:

a horizontal air supply lateral for receiving compressed air, the air supply lateral being vertically spaced-apart from a wastewater treatment basin floor;

the air supply lateral having a plurality of outlets;

a long, flexible, aerator feedline extending from each outlet to an aerator;

each aerator including a membrane support tube and a perforated membrane, the membrane being sleeved over the membrane support tube, the membrane having ends sealed to the membrane support tube, and with the membrane support tube having walls defining at least one air outlet to supply air to the membrane between the ends;

an end fitting connected to the membrane support tube at each end thereof, with walls in each end fitting defining a cable passageway;

the ends of the membrane being attached by clamps to the end fittings, such that the membrane is easily sleeved over the relatively small diameter membrane support tube, yet secure, sealed attachments are made at the end fittings;

a cable having lower and upper ends, the cable being loosely interfitted with each aerator end fitting to permit relative movement between the aerator and cable;

the lower end of the cable being fixed with respect to the bottom of the wastewater treatment basin floor by way of a ballast member;

the upper end of the cable being attached to a removable stop member, the stop member including a float;

an upper spacer tube for each end of the aerator, the upper spacer tube having upper and lower ends, the upper end contacting the stop member and the lower end contacting the aerator end fitting, such that the aerator is vertically positioned from the cable upper ends by the upper spacer tubes, but the aerator may be retrieved by removing the stop members;

with an extension cable member interposed between the cable and the stop member to permit removal of the upper spacer tube; and with a lower spacer tube for each end of the aerator, the lower spacer tube having upper and lower ends, the lower end contacting the cable lower end and the upper end contacting the aerator end fitting when the aerator has negative buoyancy, such that the aerator is vertically positioned from the ballast members by the lower spacer tubes when the system is taken out of operation.

* * * * *